(12) United States Patent
Sleegers

(10) Patent No.: US 11,059,677 B2
(45) Date of Patent: Jul. 13, 2021

(54) CONVEYOR DEVICE

(71) Applicant: Hubertus Theodorus Wilhelmus Sleegers, Nieuwkuijk (NL)

(72) Inventor: Hubertus Theodorus Wilhelmus Sleegers, Nieuwkuijk (NL)

(*) Notice: Subject to any disclaimer, the term of this patent is extended or adjusted under 35 U.S.C. 154(b) by 0 days.

(21) Appl. No.: 16/644,563

(22) PCT Filed: Sep. 4, 2018

(86) PCT No.: PCT/NL2018/050568
§ 371 (c)(1),
(2) Date: Mar. 5, 2020

(87) PCT Pub. No.: WO2019/050395
PCT Pub. Date: Mar. 14, 2019

(65) Prior Publication Data
US 2020/0290818 A1   Sep. 17, 2020

(30) Foreign Application Priority Data

Sep. 5, 2017 (NL) .................................... 2019486
Sep. 6, 2017 (NL) .................................... 2019496
Sep. 7, 2017 (NL) .................................... 2019505

(51) Int. Cl.
*B65G 47/32* (2006.01)
*B65G 15/12* (2006.01)
(Continued)

(52) U.S. Cl.
CPC ............ *B65G 47/32* (2013.01); *B65G 15/12* (2013.01); *B65G 23/44* (2013.01); *B65G 39/12* (2013.01);
(Continued)

(58) Field of Classification Search
None
See application file for complete search history.

(56) References Cited

U.S. PATENT DOCUMENTS 3,572,695 A    3/1971 Janirek et al.
4,137,604 A *  2/1979 Sandberg ................ B65B 35/50
                                               414/790.7
(Continued)

FOREIGN PATENT DOCUMENTS

DE    25 16 583    10/1976
DE    82 24 214    9/1984
NL    1022737      8/2004

OTHER PUBLICATIONS

International Search Report, PCT/NL2018/050568, dated Jan. 29, 2019.
(Continued)

*Primary Examiner* — Kavel Singh
(74) *Attorney, Agent, or Firm* — Nixon & Vanderhye

(57) ABSTRACT

Conveyor device (1) including an endless conveyor belt (4), a first drive (3) for driving the endless conveyor belt (4), a main frame (2) and an auxiliary frame (19) supported in the main frame (2), a second drive (15) for moving the auxiliary frame (19) back and forth relative to the main frame (2) in the manner of a shuttle-conveyor, such that a supply track (4a) of endless conveyor belt (4) supported by the auxiliary frame (19) can feed products (P) on a discharge track (4b) of endless conveyor belt (4) supported by the main frame (2).

20 Claims, 6 Drawing Sheets

(51) Int. Cl.
*B65G 39/12* (2006.01)
*B65G 23/44* (2006.01)
*B65G 41/00* (2006.01)

(52) U.S. Cl.
CPC .... *B65G 41/003* (2013.01); *B65G 2201/0202* (2013.01); *B65G 2203/0291* (2013.01); *B65G 2811/097* (2013.01)

(56) References Cited

U.S. PATENT DOCUMENTS

| | | | | |
|---|---|---|---|---|
| 4,330,018 | A * | 5/1982 | Sterel | D03D 47/24 139/439 |
| 7,065,936 | B2 * | 6/2006 | Lindee | B65B 35/246 53/251 |
| 7,328,542 | B2 * | 2/2008 | Sandberg | B65B 5/106 53/122 |
| 2008/0283364 | A1 | 11/2008 | Laganiere | |
| 2017/0073104 | A1 | 3/2017 | Van | |

OTHER PUBLICATIONS

NL search report, NL 2019505, dated May 18, 2018.
NL Search Report, NL 2022963, dated Dec. 6, 2019.
Written Opinion, PCT/NL2018/050568, dated Jan. 29, 2019.

* cited by examiner

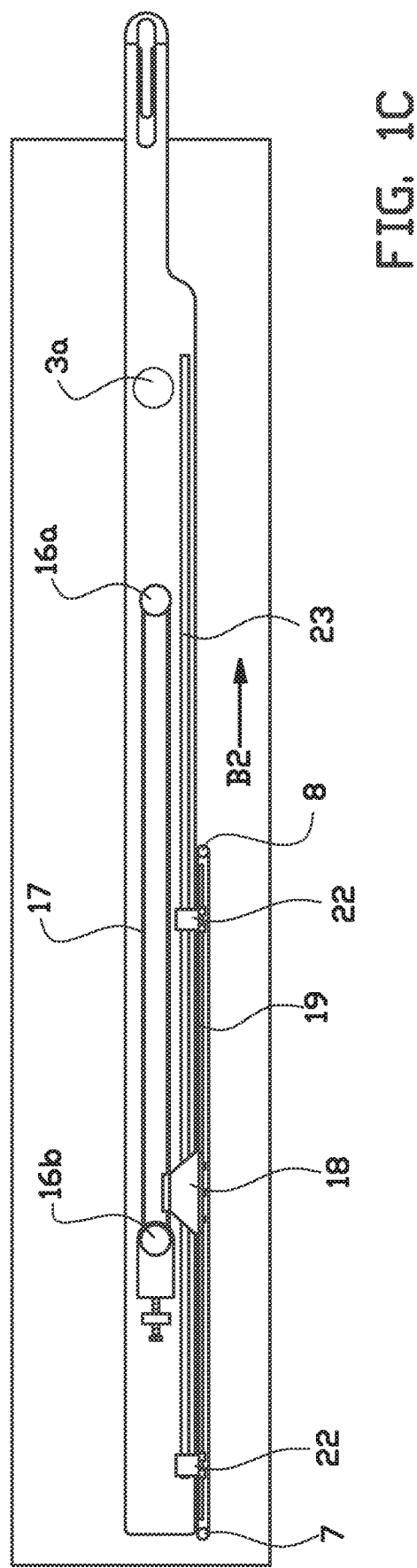

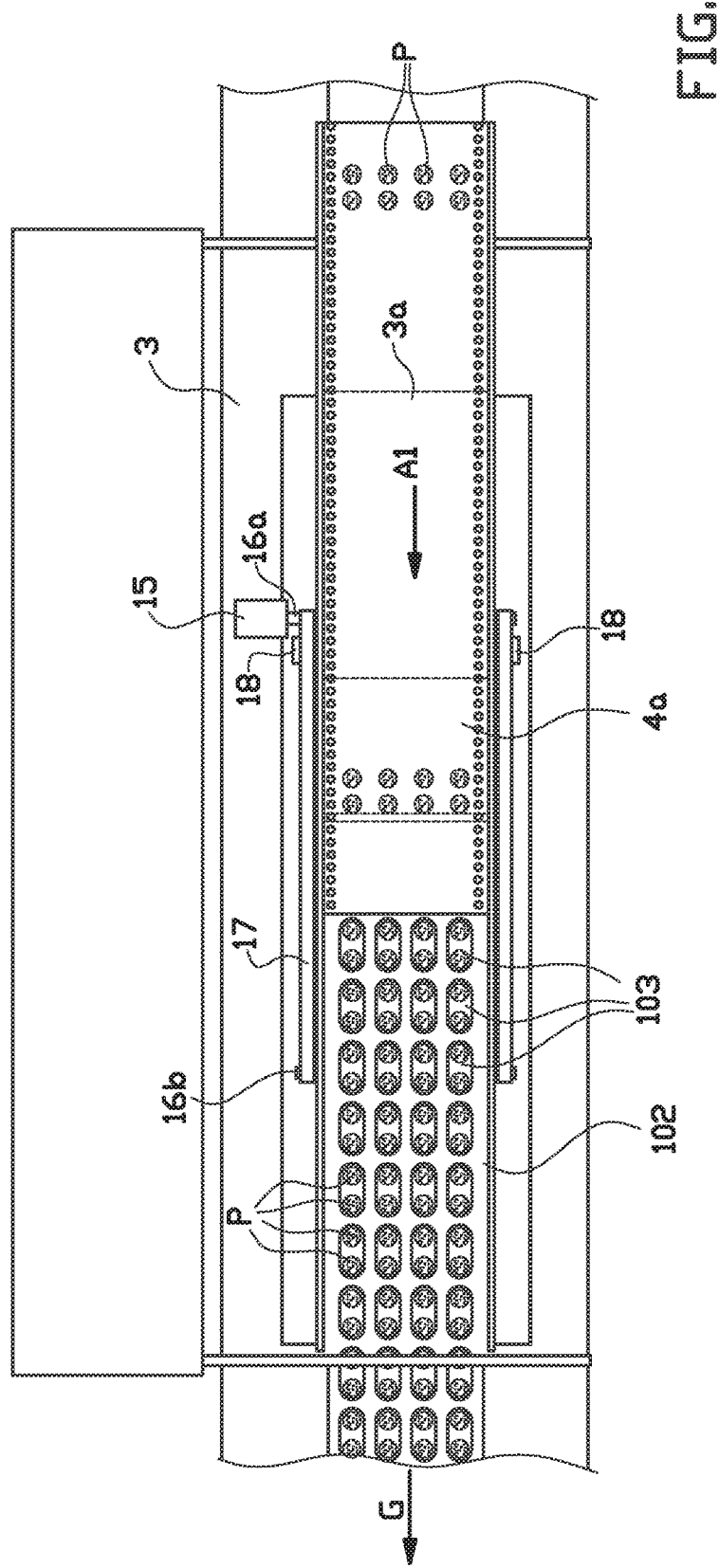

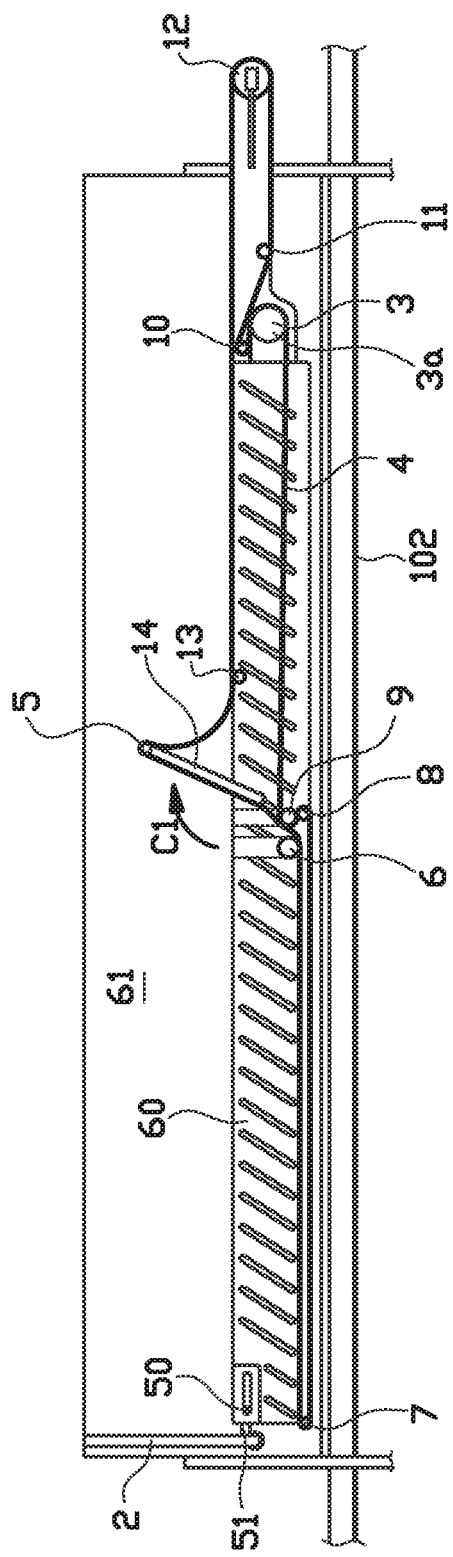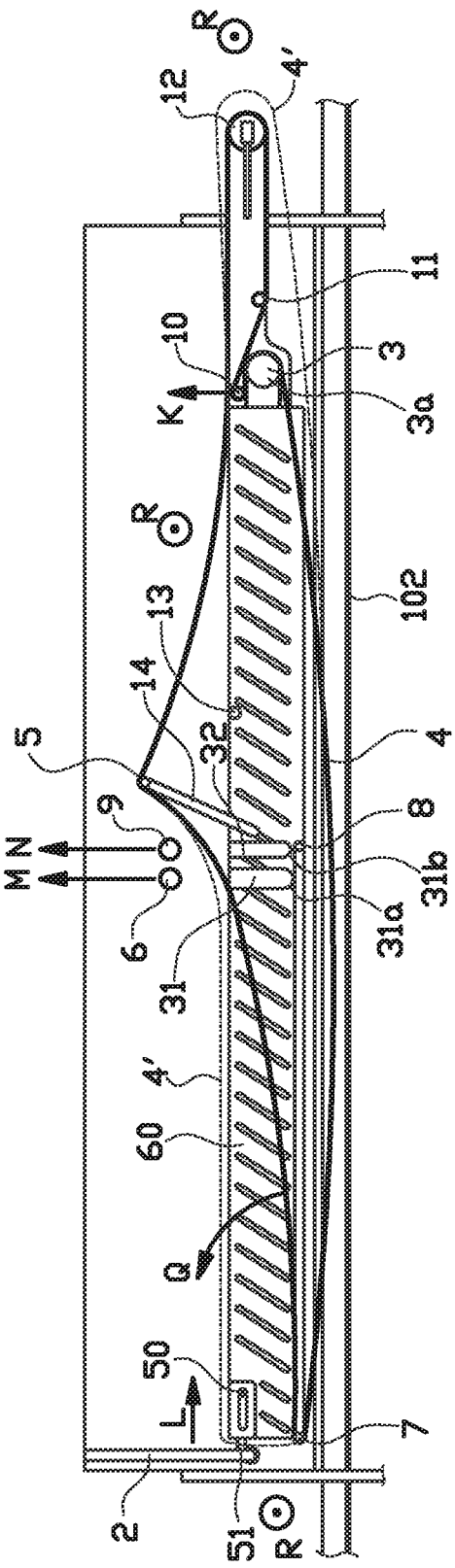

CONVEYOR DEVICE

BACKGROUND OF THE INVENTION

The invention relates to a belt conveyor provided with a so-called shuttle conveyor for discharging products supplied down the conveyor belt to a further conveyor.

A shuttle conveyor forms a discharge track of the conveyor belt and comprises an end roller at the downstream end of the conveyor belt, around which the conveyor belt circulates. Said end roller and another circulation roller situated upstream therefrom are situated on a carriage that is moved back and forth, wherein in the motion going forth the products in the discharge track are taken to above the further conveyor and subsequently, due to a fast retraction of the carriage, are released from the belt in the discharge track due to inertia and drop down onto the further conveyor, in order to stack the products thereon or receive them in holders.

Such arrangements including a shuttle conveyor require some room for the conveyor belt in the retracted position of the shuttle conveyor, as well as for the drives. By way of illustration, see NL patent 1022737, FIG. 2. All this has consequences for the dropping height of the products discharged. Flexible products, such as meat products, sliced cold meats and hamburgers may thereby be given the chance to tilt during the dropping motion, as a result of which they do not always end up at the wanted location on the further conveyor belt.

Conveyor arrangements including shuttle conveyors are furthermore known from inter alia DE-GM-8224214 and US 2017/0073104.

SUMMARY OF THE INVENTION

It is an object of the invention to improve on this.

It is an object of the invention to provide a conveyor device including shuttle conveyor with which the control of the discharge process of the products is enhanced.

According to one aspect, the invention provides a conveyor device including
- a main frame,
- an endless conveyor belt supported by the main frame,
- a number of circulation rollers defining the path of circulation of the conveyor belt,
- wherein the circulation rollers comprise a first circulation roller forming an upstream, first end roller and comprise a second circulation roller forming a downstream, second end roller,
- a first drive for driving the conveyor belt around the circulation rollers, for conveying products in a first direction, wherein the opposite direction is a second direction, wherein the conveyor device has a discharge track ending at the location of the second end roller,
- wherein the conveyor device furthermore comprises:
- an auxiliary frame supported in the main frame on which auxiliary frame the second end roller and a third circulation roller are arranged,
- a second drive for moving the auxiliary frame back and forth relative to the main frame in the first and second directions, in the manner of a shuttle conveyor,
- wherein the conveyor belt forms an open loop in the auxiliary frame, the shape of which loop is at least also defined by the second end roller and a third circulation roller, as well as by fourth and fifth circulation rollers arranged in the main frame above the line connecting the bottom sides (of the treads) of the second end roller and the third circulation roller to one another, and situated stationary relative to the auxiliary frame, for circulation of the inbound part and the outbound part, respectively, of the said open loop.

As the open loop that is situated on the auxiliary frame that is moved back and forth, which auxiliary frame can be retracted by the second drive at relatively high speed in the second direction for fulfilling the function of shuttle conveyor, connects to the connecting tracks of the circulating conveyor belt in upward direction, the space below the auxiliary frame and therefore below the discharge track can at least almost be entirely available to a further conveyor device and product holders optionally situated thereon. In the vertical sense they may be situated close to the displacement path of the second end roller, as a result of which the dropping height of the products in the transfer from the discharge track to the further conveyor device can remain within limits. The open loop may be flat and in particular in the auxiliary frame circulate only around the second end roller and the third circulation roller.

In particular the fourth and the fifth circulation rollers can be situated above the line connecting the center lines of the second end roller and the third circulation roller to one another, be situated in particular above the line connecting the top sides (of the treads) of the second end roller and the third circulation roller to one another, be situated more in particular above the profile of the displacement path of the second end roller and the third circulation roller, when considered in a vertical plane of projection transverse to the displacement direction of the auxiliary frame. The fourth and fifth circulation rollers can be situated above the displacement path of the auxiliary frame.

In one embodiment in which leaving the space below the displacement path of the auxiliary frame free, in particular below the second end roller and/or the third circulation roller, is enhanced, the first drive comprises a circulation roller configured as drive roller for the conveyor belt, wherein the center line of the drive roller, in particular the entire circumference of the drive roller is situated at a level higher than the profile of the displacement path of the second end roller and the third circulation roller (when considered in a vertical plane of projection transverse to the displacement direction of the auxiliary frame), is situated in particular above an infinite horizontal line connecting the top sides of the second end roller and the third circulation roller to one another, in particular straight above said profile. In one embodiment all circulation rollers, with the exception of the circulation rollers arranged on the auxiliary frame, are situated with their center lines, in particular with their entire circumferences, at a level that is situated higher than the profile of the displacement path of the second end roller and the third circulation roller (when considered in a vertical plane of projection transverse to the displacement direction of the auxiliary frame), are situated in particular above an infinite horizontal line connecting the top sides of the second end roller and the third circulation roller to one another, in particular straight above said profile.

All circulation rollers can be situated entirely above the line connecting the bottom sides of the second end roller and the third circulation roller to one another.

All circulation rollers, with the exception of the circulation rollers arranged on the auxiliary frame, can be situated above the profile of the displacement path of the auxiliary frame.

The belt track extending between the second end roller and the third circulation roller can form the lowest point of the entire belt circulation path.

In one embodiment; the conveyor belt runs from the first end roller in the first direction, via the fourth circulation roller, towards the second end roller, runs from the second end roller in the second direction, underneath, towards the third circulation roller and from there runs overhead in the first direction towards the fifth circulation roller and at that location runs in upward direction around the fifth circulation roller to proceed in the second direction and finally end up at the first end roller.

In an embodiment that is compact in the vertical sense, the fourth and fifth circulation rollers are situated at the same level.

In a further embodiment the conveyor device is provided with a sixth circulation roller which, when considered in the first direction, is located in front of the fourth circulation roller and supported in the main frame (the sixth circulation roller therefore is situated downstream of the fourth circulation roller), and which forms a third end roller around which the conveyor belt circulates prior to reaching the fourth circulation roller via an intermediate track in the second direction, wherein the third end roller is situated at a level above the displacement path of the second end roller, in particular straight above said displacement path.

The sixth circulation roller (third end roller) forms the end of a supply track of the conveyor belt. From there the products can be discharged to the conveyor belt where it forms the discharge track. The supply track then extends between the first end roller and the third end roller. In that way one conveyor belt provides a supply track having a fixed belt length, on which products can be supplied, and a discharge track formed by a shuttle conveyor.

In an embodiment that is compact in the vertical sense, in which the products are disturbed as little as possible, the third end roller is situated just above the belt in the discharge track. The third roller can be held such that the belt running around the third end roller does not contact the belt between the fourth circulation roller and the second end roller. With its bottom side, in particular with its center line, the third end roller can be situated at a level below the top side of the fourth circulation roller, in particular below the center line of the fourth circulation roller. The third end roller can have a diameter that is smaller than the diameter of the fourth circulation roller and with its top side be situated at a level below the top side of the fourth circulation roller, For facilitating maintenance operations, the third end roller can be arranged on a holder that can be swung between a position in which the third end roller is in the operative position, and a maintenance position swung towards an upstream side, wherein the holder can be swung for that purpose about a horizontal center line that is transverse to the conveyance direction and is situated at the upstream side of the center line of the third end roller. In that way easy access is given to the fourth and/or fifth circulation rollers, which in one embodiment are rotatably supported with their outer ends in bottom ends of grooves in the main frame and/or up to the auxiliary frame, which grooves extend in upward direction. In the swung maintenance position, the center line of the third end roller can rest behind, that means situated upstream of the swing center line, and against a stop.

Advantageously, said swing center line is situated at a distance from the second end roller of the conveyor device, which distance exceeds the distance for the circumference of the fourth and/or fifth circulating roller to the second end roller.

In one embodiment, the conveyor device is provided with a control for controlling the first and the second drives such that the belt speed corresponds with the speed of the displacement of the auxiliary frame in the downstream (first) direction. The transfer of the products from the supply track to the discharge track is thus made easier, According to a further aspect the invention provides a conveyor device including
   a main frame,
   a supply device supported by the main frame and including a supply track having a supply belt conveyor for conveying products from an inlet at which location a first end roller for the belt conveyor is situated,
   a discharge device supported by the main frame including a discharge track having a discharge belt conveyor for discharging the products at a discharge end, at which location a second end roller for the discharge belt conveyor is situated,
wherein the discharge device comprises an auxiliary frame, which in a displacement path can be moved back and forth relative to the main frame in the manner of a shuttle conveyor for in its returning motion discharging the products in downward direction, such as to a further conveyor device situated below the displacement path,
wherein the supply belt conveyor and the discharge belt conveyor are configured with the same endless conveyor belt circulating around a number of circulation rollers, and moving through the supply track and the discharge track,
wherein the conveyor device furthermore comprises
   a first drive for driving the endless conveyor belt in a circulating manner, and
   a second drive for moving the auxiliary frame back and forth,
wherein the supply track ends at the location of a circulation roller forming a third end roller, which third end roller is situated above the discharge track.

That way, one conveyor belt provides a supply track having a fixed belt length on which products can be supplied, and a discharge track formed by a shuttle conveyor, wherein the space below the shuttle conveyor is at least largely available to other devices.

In one embodiment the conveyor belt forms an open loop, in particular a flat, open loop, in the auxiliary frame, the shape of which loop is at least also defined by the second end roller and the third circulation roller, as well as by fourth and fifth circulation rollers arranged in the main frame above the line connecting the bottom sides of the second end roller and the third circulation roller to one another, in particular above the said profile of the displacement path of the second end roller and third end roller, and situated stationary relative to the auxiliary frame for circulation of the inbound part and the outbound part, respectively, of the loop, wherein the fourth and fifth circulation rollers are situated at a horizontal distance from the second end roller which distance exceeds the distance from the third end roller to the second end roller.

In one embodiment the first drive comprises a circulation roller configured as drive roller for the conveyor belt, wherein the center line of the drive roller, in particular the entire circumference of the drive roller is situated at a level higher than the said profile of the displacement path of the second end roller and the third circulation roller in particular above an infinite horizontal line connecting the top sides of the second end roller and the third circulation roller to one another, in particular straight above the displacement path of the auxiliary frame, when considered in side view.

In one embodiment all circulation rollers, with the exception of the circulation rollers arranged on the auxiliary frame, are situated with their center lines, in particular with their entire circumferences, at a level that is situated higher than the said profile of the displacement path of the second end roller and the third circulation roller, in particular above an infinite horizontal line connecting the top sides of the second end roller and the third circulation roller to one another, in particular straight above the displacement path of the auxiliary frame, when considered in side view.

According to a further aspect the invention provides a conveyor device including
   a main frame,
   an endless conveyor belt supported by the main frame,
   a number of circulation rollers over which the conveyor belt circulates, including a first upstream end roller,
   a first drive for driving the conveyor belt in conveyance direction, around the circulation rollers,
wherein the conveyor device has a discharge end having a circulation roller forming a second, downstream end roller of the conveyor device,
   an auxiliary frame supported in the main frame on which auxiliary frame the second end roller and a third circulation roller are situated,
   a second drive for moving the auxiliary frame back and forth relative to the main frame in directions parallel to the conveyance direction, in the manner of a shuttle conveyor,
wherein the first drive comprises a circulation roller configured as drive roller for the conveyor belt, wherein the center line of the drive roller, in particular the entire circumference of the drive roller is situated at a level higher than the profile of the displacement path of the end roller and circulation roller that are accommodated in the auxiliary frame (when considered in a vertical plane of projection transverse to the displacement direction of the auxiliary frame, in particular above an infinite horizontal line connecting the top sides of the second end roller and the third circulation roller that are accommodated in the auxiliary frame to one another) are situated, in particular straight above the displacement path of the auxiliary frame, when considered in side view. That way the possibility of leaving the space below the displacement track of the auxiliary frame open, is enhanced.

In one embodiment thereof, the conveyor belt in the circulation comprises a supply track, a discharge track and a return track extending between the discharge track and supply track, wherein the discharge track ends at the location of the said second end roller, wherein the supply track is situated upstream of the discharge track and ends at the location of a circulation roller forming the downstream (third) end roller of the supply track and being situated above the discharge track.

The circulating conveyor belt can be considered as comprising two open loops that connect to each other: an (upward) open loop on the auxiliary frame that can be moved back and forth and a (downward) open loop in the relatively stationary main frame.

The stationary open loop can extend in the first direction over the locations of transition between both open loops and at that location can be arranged such that the overlapping part can be moved away (such as for instance said holder with third end roller) for making the locations of transition accessible and easily removing the fourth and fifth circulation rollers situated at that location. As a result, the freedom in giving shape to the belt circulation is strongly increased, as a consequence of which the removal of the endless conveyor belt is facilitated. It can then be removed in a direction transverse to the vertical plane of circulation, to be cleaned or to be replaced.

For facilitating the removal of the fourth and fifth circulation rollers, they can be supported by pins or shafts without additional fastening means, such as nuts or bolts, on the bottoms of vertical grooves in/on the main frame which grooves are open at their upper ends.

According to a further aspect the invention provides an assembly of a conveyor device according to any one of the preceding claims and a supply device of product holders, wherein the supply device forms a transportation surface for the product holders and is positioned for, below the discharge track of the conveyor device, making the product holders available to products supplied down the discharge track by the conveyor device, within the vertical space bounded by both end positions of the downstream end roller of the conveyor device in the back-and-forth motion. That way the open space below the shuttle conveyor can be profited from optimally, wherein the falling height can be minimal.

The supply device may extend underneath the conveyor belt and supply the product holders parallel to the back-and-forth motion of the auxiliary frame, in particular in the first direction, wherein in the horizontal sense the occupation of space can be kept within limits.

Thus, a method can be provided for having said assembly operational, wherein the downstream end roller of the conveyor device is situated at a vertical distance from the transportation surface of the supply device which distance is between approximately 0.5 to approximately twice the height of the product holders.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

BRIEF DESCRIPTION OF THE DRAWINGS

The invention will be elucidated on the basis of an exemplary embodiment shown in the attached drawings, in which:

FIG. 1C shows a detail of the side view of FIG. 1A; FIGS. 2A and 2B show a side view and a top view, respectively, of the conveyor device of FIGS. 1A and 1B, however, this time in a condition in which the shuttle conveyor is in its ultimate retracted position; and FIGS. 3A and 3B show an illustration of removing the conveyor belt in an example of a device according to the invention.

DETAILED DESCRIPTION OF THE DRAWINGS

Figure 1A:
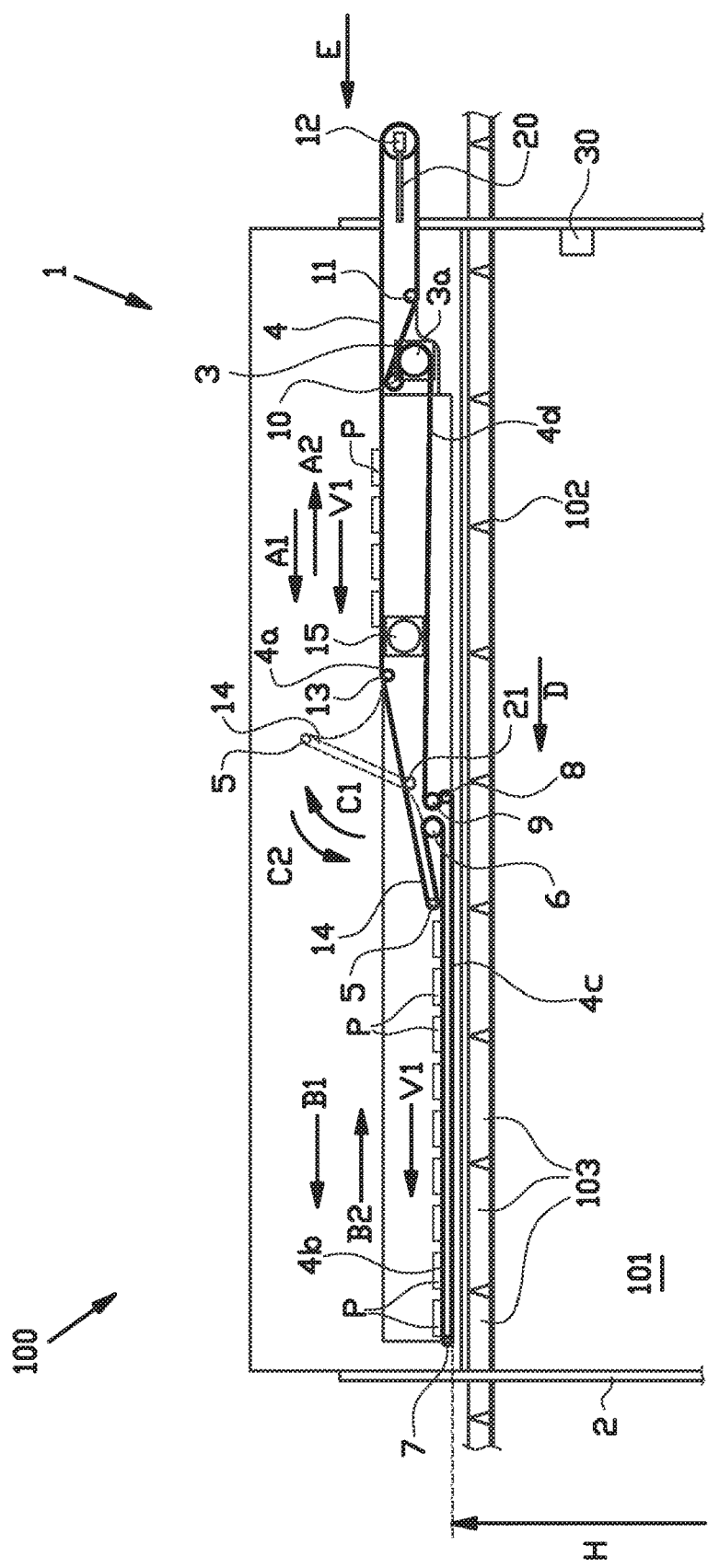
FIGS. 1A and 1B show a side view and a top view, respectively, of a conveyor device according to the invention, in a condition in which the shuttle conveyor is in its ultimate extended position.

FIG. 1A schematically shows an example of a conveyor device 1 according to the invention, having a main frame 2 supported on a floor, in which main frame a conveyor belt 4 is supported which is driven so as to circulate by a first drive, motor 3 with drive roller 3a. The conveyor belt 4 circulates in directions A1 (above), A2 (below), around circulation rollers 5,6,7,8,9, drive roller 3a, circulation rollers 11,12 and 13. The circulation rollers 5-9 and 12 are turning rollers at which location the course of the belt turns over at least almost 180 degrees. All circulation rollers, except drive roller 3a are idle.

Figure 1B:
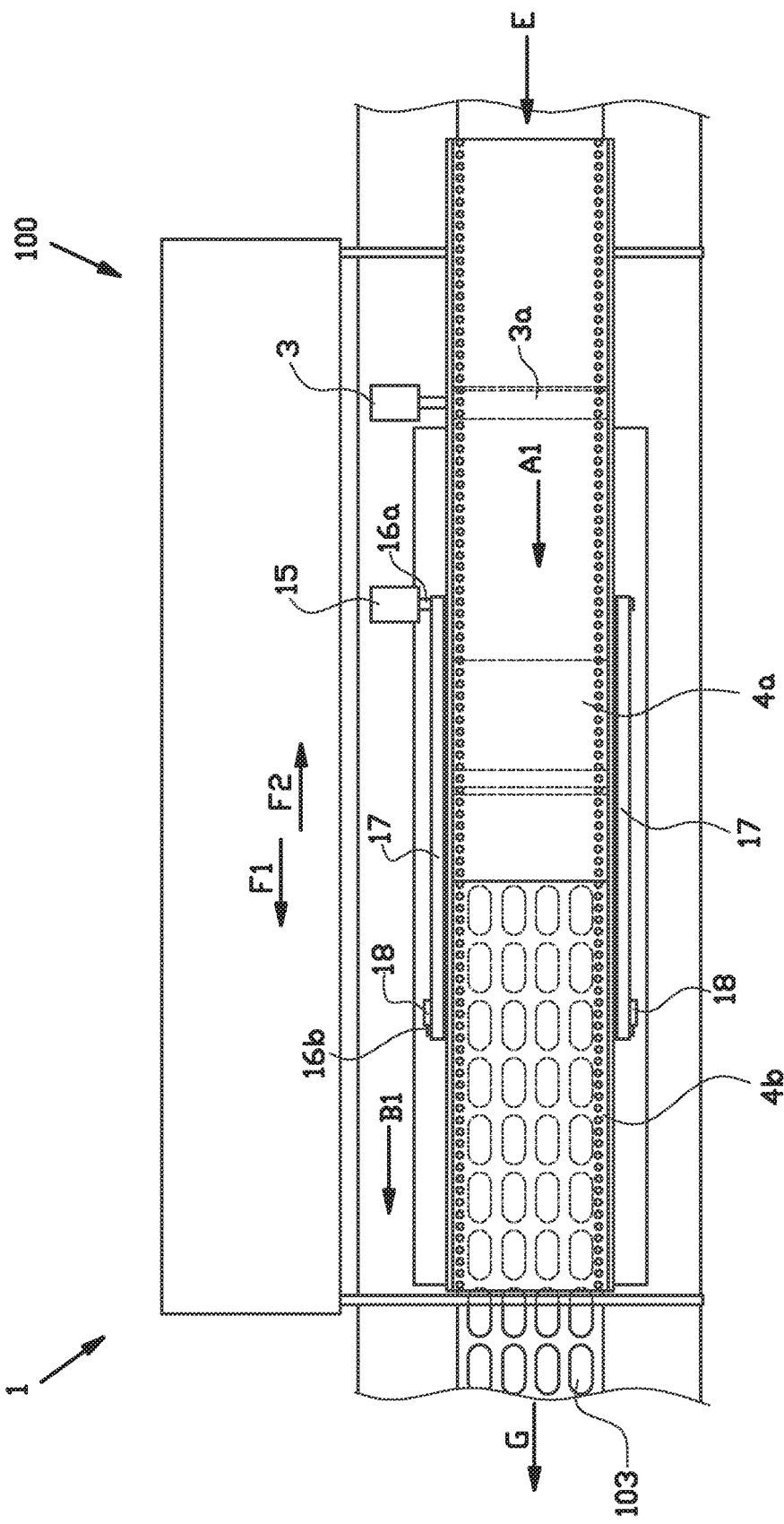

The circulation roller 12 forms a first end roller, arranged on a belt tensioning unit 20, at the inlet end. The circulation roller 7 forms a second end roller, at the discharge end. The relatively thin circulation rollers 7 and 8 (third circulation roller) are arranged on an auxiliary frame or carriage 19 (FIG. 1C), which can be moved back and forth in the first and second directions B1,B2 by a second drive, motor 15 (FIG. 1B) arranged in the main frame. The carriage 19 is guided on either side by each time two sliding pieces 22 on slide rods 23. Via connections 18, the carriage 19 is connected on both sides to geared belts 17 situated on either side, which geared belts circulate about transverse shafts 16a, 16b, wherein the transverse shaft 16a is driven by the reversible motor 15. The motor 15 can be controlled for applying a high speed to the carriage 19 in the second direction B2, as is known for shuttle conveyors.

The motors 3 and 15 are controlled by a programmable control unit 30 including processor, in which data regarding the positions of the products and holders are processed as well.

The (sixth) circulation roller 5 is also slim and arranged at the end of a holder 14 that is arranged in the main frame so as to be swung in the directions C1, C2, enabled to be swung about a horizontal center line 21, between an operational position and a maintenance position shown with dashed lines, in which the belt is relaxed, limp and the stationary (fourth and fifth) circulation rollers 6 and 9 can be accessed by the mechanic from above. In a manner so as to be freely rotatable, the circulation rollers 6 and 9 are supported on the bottoms of vertical grooves (not shown) that are open at their upper ends (see FIG. 3B, grooves 31, 32 and bottoms 31a, 32a), so that they can be removed easily. In the maintenance position the holder 14 can rest against a stop.

In the circulation of the belt 4 the following can be distinguished consecutively:
- a supply track 4a extending between the first end roller 12 and the circulation roller 5, in that case forming a third end roller;
- a short intermediate track between the end roller 5 and the (fourth) circulation roller 6;
- a discharge track 4b between the circulation roller 6 and the second end roller 7;
- a first return track 4c between the second end roller 7 and the (fifth) circulation roller 9, via the (third) circulation roller 8; and
- a second return track 4d between the circulation roller 9 and the first end roller 12, wherein the belt runs around/along the drive roller 3a in order to be driven by it. The supply track, the short intermediate track and the second return track are stationary relative to the main frame (apart from the moving belt). The discharge track and the first return track move along with the carriage 19.

That way the belt between the circulation rollers 6 and 9, with tracks 4b and 4c, forms an open loop (due to the circulation rollers 6 and 9 not coinciding). The belt 4 forms an inbound part at the circulation roller 6 and forms an outbound part of the loop at the circulation roller 9. As the inbound and outbound parts of said open loop are situated at the top side of the open loop, the first return track between the rollers 7 and 8 is able to form a lowest point of the circulation of the belt 4, The supply track 4a, the intermediate track and the second return track 4d also form an open loop of which the opening is situated at its bottom side.

The circulation rollers 6 and 9 are situated horizontally adjacent to each other, at an as short as possible distance.

The circulation roller 9, considered in downstream direction, is situated slightly ahead of the circulation roller 8 in the ultimate extended position of the carriage 19 (FIG. 1A). The circulation roller 6 can be situated close to the third end roller 5, but to keep the distance between the end roller 5 and the belt track 4b as small as possible, the circulation roller 6 is situated slightly receded (in the upstream direction) so that the holder 14 with end roller 5 is capable of extending downwardly inclined over the circulation roller 6, in the downstream direction.

Figure 2A:
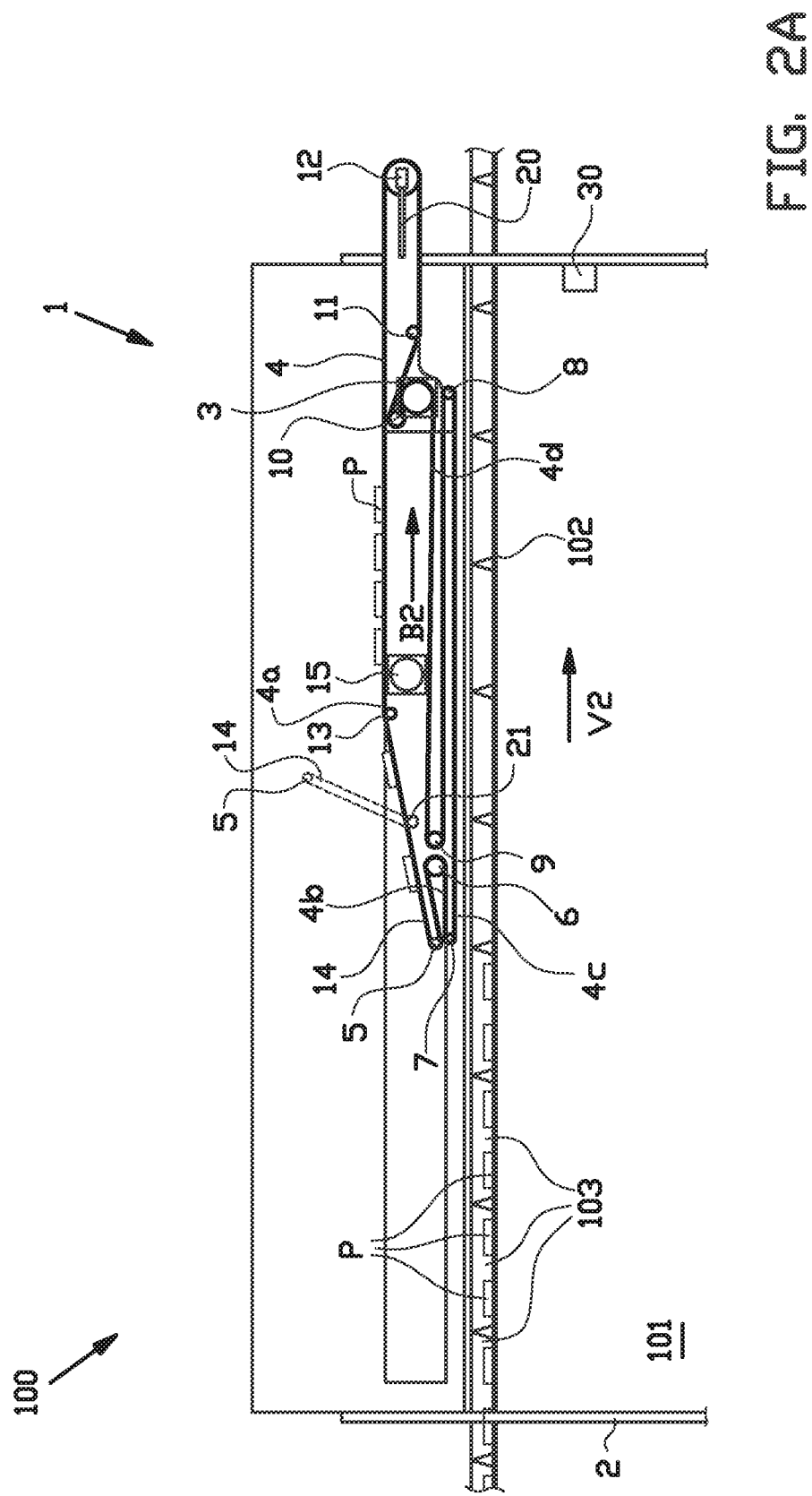

In the side views of FIGS. 1A and 2A it can be seen that all circulation rollers, with the exception of the circulation rollers 7 and 8 arranged on the auxiliary frame, but including the drive roller 3a, are situated at a level that is higher than that of the displacement path of the rollers 7 and 8 and of the carriage 19. In this example said circulation rollers are situated above the vertical profile of the displacement path of the second end roller 7 and the third circulation roller 8 (when considered in a vertical plane of projection transverse to the directions B1, B2), in particular above an infinite horizontal line connecting the top sides (of the circumference in engagement with the belt) of the rollers 7 and 8. They are also situated above the displacement path of the auxiliary frame, considered in side view of the FIGS. 1A and 2A, when combined. As a result, the length of the conveyor device 1 is kept within limits, as not much more than the distance between the circulation roller 7 in the extended position (FIG. 1A) and the circulation roller 8 in the retracted position (FIG. 2A) of the carriage 19. Further, a lot of vertical space H (FIG. 1A) is available below the belt circulation, as the return track 4c defines the lowest level of the belt circulation.

As a consequence thereof, it is possible to place a supply conveyor 101, forming an assembly 100 with the conveyor device 1, below the belt 4, for supplying holders 103 with supply belt 102 in a direction D, parallel to the first direction B1. In the vertical sense, the supply belt 102 can then be taken very close to the bottom side of the belt 4c, as a result of which the dropping height of the products in the transfer from the belt in the discharge track 4b to the bottom of the holders 103 can be as small as possible. This is advantageous in creating the wanted position of the products in the holders 103. The holders 103 may come from a forming device, such as a vacuum forming device, situated upstream from the supply belt 102.

In operation, products P, such as slices of cold meats or hamburgers, supplied in the direction E and down the supply track 4a, in the first direction B1, are conveyed to the third end roller 5 at speed V1. The products P run off from it and end up on the belt 4 on the discharge track 4b. The carriage 19 is operated to move from the retracted position in FIG. 2A,B to the extended position of FIG. 1A, B. As the carriage 19 is then moved in the direction B1 by the second motor 15 at the same speed V1, the products P can as it were nestle themselves on the belt 4 during the transfer.

Meanwhile tray-shaped holders 103 are supplied on the supply conveyor 102, up to a position below the discharge track 4b in the ultimate extended position of FIG. 1A and kept there. When the carriage 19 has finally arrived in the ultimate position of FIG. 1A, the second motor 15 is operated to retract the carriage 19 at high speed V2 in direction B2. As is known per se for shuttle conveyors, the products P are then left behind and due to the absence of a support they will fall into the holders 102 that are kept at the ready. As the dropping height can be small, the products hardly have any chance to change their shape and/or orientation under the influence of gravity and the friction with the belt 4 pulling away. The filled holders 103 are conveyed onward in the direction G.

During the fast retracting motion of the carriage 19 it is ensured that no products pass over the third end roller 5.

The belt 4 can be continuously driven by the motor 3 and the drive roller 3a at speed V1.

If the belt 4 needs to be cleaned or replaced, the manner of operation as indicated in FIGS. 3A and 3B can be followed. They schematically show that the main frame carries a long casing 60, wherein it must be understood that in the given side view, this casing is actually situated in front of the belt circulation. However, for reasons of illustration the belt 4 is depicted as an interrupted line. Considered in the first direction F1 the casing 60 is then situated on the left-hand side of the device 1. A superstructure 61 on the main frame is then situated on right-hand side. On that side the motors 3 and 15 are also situated. At the downstream end, the casing 60 is detachably coupled to a part of the main frame 2 by means of a locking pin 51. Said locking pin can be detached by slide 51.

In the extended position, the auxiliary frame 19 can be stopped by motor 3, as can the belt circulation. The support 14 is then swung in the direction C1 upwards and rearwards, as described above, and then the situation of FIG. 3A is achieved. The fourth circulation roller 6 can be grabbed and, in the direction IA be lifted with the end pins from the groove 31. After temporarily bending a belt portion sideways this can also be done for the fifth circulation roller 9, direction N. Upstream the circulation roller 10 is removed (direction K), after which the belt 4 can hang downwards, in the track between the first end roller 12 and end roller 5 standing elevated and in the connecting track between the end roller 5 and the second end roller 7. After that, the slide 50 can be retracted and as a consequence the locking pin, direction L.

Subsequently the belt 4 can be brought into a wide shape 4' (shown in dashed lines in FIG. 3B), among other see direction Q, which makes it possible to remove the belt in the transverse direction R from the device 1, past the downstream end and past the upstream end.

The invention is/inventions are not at all limited to the embodiments discussed in the description and shown in the drawings. The above description is included to illustrate the operation of preferred embodiments of the invention and not to limit the scope of the invention. Starting from the above explanation many variations that fall within the spirit and scope of the present invention will be evident to an expert. Variations of the parts described in the description and shown in the drawings are possible. They can be used individually in other embodiments of the invention(s). Parts of the various examples given can be combined together.

The invention claimed is:

1. A conveyor device, comprising:
   a main frame;
   an endless conveyor belt supported by the main frame, the conveyor having an inlet end and a discharge end;
   a plurality of circulation rollers defining a path of circulation of the conveyor belt, the circulation rollers including a first circulation roller forming an upstream first end roller at the inlet end, and a second circulation roller forming a downstream second end roller at the discharge end;
   a first drive for driving the conveyor belt around the circulation rollers, for conveying products in a first direction;
   a discharge track ending at the location of the second end roller;
   an auxiliary frame supported in the main frame, the second end roller and a third circulation roller arranged on said auxiliary frame; and
   a second drive for moving the auxiliary frame back and forth relative to the main frame in the first direction and a second direction opposite the first direction, in the manner of a shuttle conveyor, the shuttle conveyor being retractable at a relatively high speed for releasing the products situated on the discharge track from the conveyor belt due to inertia and permitting the products to drop down with gravity,
   wherein the conveyor belt forms an open loop in the auxiliary frame, a shape of said open loop being defined by the second end roller and the third circulation roller, as well as by fourth and fifth circulation rollers arranged in the main frame above a line connecting bottom sides of the second end roller and the third circulation roller to one another, and situated stationary relative to the auxiliary frame, for circulation of the inbound part and the outbound part, respectively, of said open loop.

2. The conveyor device according to claim 1, wherein the fourth and the fifth circulation rollers are situated above a profile of a displacement path of the second end roller and the third circulation roller when considered in a vertical plane of projection transverse to the displacement path of the auxiliary frame.

3. The conveyor device according to claim 1, wherein the first drive comprises a circulation roller configured as a drive roller for the conveyor belt, wherein the entire circumference of the drive roller is situated above an infinite horizontal line connecting the top sides of the second end roller and the third circulation roller to one another, straight above a displacement path of the auxiliary frame when considered in side view.

4. The conveyor device according to claim 1, wherein entire circumferences of all the circulation rollers, except for circulation rollers arranged on the auxiliary frame, are situated above an infinite horizontal line connecting top sides of the second end roller and the third circulation roller to one another, straight above a displacement path of the auxiliary frame when considered in side view.

5. The conveyor device according to claim 1, wherein the plurality of circulation rollers further comprise a sixth circulation roller which, when considered in the first direction is located in front of the fourth circulation roller and supported in the main frame, and which forms a third end roller around which the conveyor belt circulates prior to reaching the fourth circulation roller via a track in the second direction,
   wherein the third end roller is situated at a level above a displacement path of the second end roller, straight above a displacement path of the auxiliary frame, when considered in side view, wherein the third end roller forms an end of a supply track of the conveyor belt from which the products can be discharged to the conveyor belt where the conveyor belt forms the discharge track, and
   wherein the third end roller is situated just above the belt in the discharge track, wherein a bottom side and center line of the third end roller is situated at a level below a top side of the fourth circulation roller below a center line of the fourth circulation roller.

6. The conveyor device according to claim 5, wherein the third end roller is arranged on a holder that swings between a first position in which the third end roller is in the operative position, and a maintenance position swung towards the upstream side, the holder being swingable about a horizontal center line that is transverse to a conveyance direction and situated at the upstream side of the circumference of the third end roller.

7. The conveyor device according to claim 6, wherein said center line is situated at a distance from the second end roller of the conveyor device, wherein said distance exceeds a distance of the circumference of the fourth and/or fifth circulating roller to the second end roller.

8. The conveyor device according to claim 1, further comprising:
a control for controlling the first and second drives such that the belt speed corresponds with a speed of a displacement of the auxiliary frame in the first direction.

9. An assembly, comprising:
a conveyor device according to claim 1; and
a supply device of product holders,
wherein the supply device forms a transportation surface for the product holders and is positioned for, below the discharge track of the conveyor device, making the product holders available to products supplied down the discharge track by the conveyor device, within the vertical space bounded by both end positions of the second end roller of the conveyor device in the back-and-forth motion.

10. The assembly according to claim 9, wherein the supply device extends underneath the conveyor belt, for supplying the product holders parallel to the back-and-forth motion of the auxiliary frame in the first direction.

11. A method for having an assembly according to claim 9 operational,
wherein the products are supplied down the conveyor belt into the discharge track, the product holders are supplied by the supply device into a position below the discharge track in the ultimate extended position of the auxiliary frame, and the auxiliary frame is subsequently retracted at a relatively high speed while dropping the products into the product holders.

12. The method according to claim 11, wherein the downstream end roller of the conveyor device is situated at a vertical distance from the transportation surface of the supply device, which distance is between approximately 0.5 to approximately twice the height of the product holders.

13. A conveyor device, comprising:
a main frame;
a supply device supported by the main frame and including a supply track having a supply belt conveyor for conveying products from an inlet at which location a first end roller for the belt conveyor is situated;
a discharge device supported by the main frame including a discharge track having a discharge belt conveyor for discharging products at the discharge end, at which location a second end roller for the discharge belt conveyor is situated,
the discharge device including an auxiliary frame, which in a displacement path can be moved back and forth relative to the main frame in the manner of a shuttle conveyors in a relatively high speed returning motion for discharging the products in a downward direction,
the supply belt conveyor and the discharge belt conveyor configured with a same endless conveyor belt circulating around a plurality of circulation rollers, and moving through the supply track and the discharge track;
a first drive for driving the endless conveyor belt in a circulating manner; and
a second drive for moving the auxiliary frame back and forth,
wherein the supply track ends at the location of a circulation roller forming a third end roller, which third end roller is situated above the discharge track,
wherein the conveyor belt forms two loops, which at the location of transitions connect to each other, merge into each other, with an open loop on the auxiliary frame that can be moved back and forth and an open loop in the relatively stationary main frame, and
wherein the third end roller when considered in conveyance direction extends over the locations of transition and can be moved to a maintenance position in which those locations of transition are accessible.

14. The conveyor device according to claim 13, wherein the conveyor belt forms a flat, open loop, in the auxiliary frame, the loop having a shape that is at least also defined by the second end roller and the third circulation roller, as well as by fourth and fifth circulation rollers arranged in the main frame above the profile of a displacement path of the second end roller and third circulation roller when considered in a vertical plane of projection transverse to the displacement direction of the auxiliary frame, and situated stationary relative to the auxiliary frame, for circulation of the inbound part and the outbound part, respectively, of the loop, wherein the fourth and fifth circulation rollers are situated at a horizontal distance from the second end roller which distance exceeds the distance from the third end roller to the second end roller.

15. The conveyor device according to claim 13, wherein the first drive comprises a circulation roller configured as drive roller for the conveyor belt, wherein the entire circumference of the drive roller is situated at a level higher than the profile of a displacement path of the second end roller and the third circulation roller when considered in a vertical plane of projection transverse to the displacement direction of the auxiliary frame, straight above a displacement path of the auxiliary frame when considered in side view.

16. The conveyor device according to claim 13, wherein entire circumferences of all the circulation rollers, except for the circulation rollers arranged on the auxiliary frame, are situated above an infinite horizontal line connecting the top sides of the second end roller and the third circulation roller to one another, straight above a displacement path of the auxiliary frame when considered in side view.

17. The conveyor device according to claim 13, wherein the third end roller is arranged on a holder that is swingable between a first position in which the third end roller is in the operative position, and a maintenance position swung towards an upstream side, holder being swingable about a horizontal center line that is transverse to a conveyance direction and situated at the upstream side of the third end roller.

18. The conveyor device according to claim 13, wherein the locations of transition are defined by fourth and fifth circulation rollers that are arranged stationary in the main frame and guide the inbound part and the outbound part, respectively, of the open loop on the auxiliary frame.

19. The conveyor device according to claim 18, wherein the fourth and fifth circulation rollers are mounted by pins or shafts in accommodation spaces in the main frame, without fasteners, and supported on bottoms of vertical grooves in/on the main frame, top ends of said grooves being open.

20. The conveyor device according to claim 18, wherein from the first end roller the conveyor belt runs in the first direction, via the fourth circulation roller, towards the second end roller, runs from the second end roller in the second direction, underneath, towards the third circulation roller and from there runs overhead in the first direction towards the fifth circulation roller and at that location runs in upward direction around the fifth circulation roller to proceed in the second direction and finally ends up at the first end roller.

* * * * *